(12) United States Patent
Buesing

(10) Patent No.: US 10,189,563 B2
(45) Date of Patent: Jan. 29, 2019

(54) BEAM FOR A ROTORCRAFT ROTOR AND ROTORCRAFT ROTOR

(71) Applicant: AIRBUS HELICOPTERS DEUTSCHLAND GMBH, Donauworth (DE)

(72) Inventor: Moritz Buesing, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 349 days.

(21) Appl. No.: 14/557,995

(22) Filed: Dec. 2, 2014

(65) Prior Publication Data
US 2015/0158582 A1 Jun. 11, 2015

(30) Foreign Application Priority Data
Dec. 10, 2013 (EP) ..................... 13400037

(51) Int. Cl.
*B64C 27/50* (2006.01)
*B64C 27/33* (2006.01)
*B64C 27/35* (2006.01)

(52) U.S. Cl.
CPC .............. *B64C 27/33* (2013.01); *B64C 27/35* (2013.01)

(58) Field of Classification Search
CPC ......... B64C 27/33; B64C 27/41; B64C 27/35; B64C 27/48
USPC ..................................... 416/134 A
See application file for complete search history.

(56) References Cited

U.S. PATENT DOCUMENTS

| | | | |
|---|---|---|---|
| 3,669,566 A | 6/1972 | Bourquardez et al. |
| 4,352,631 A | 10/1982 | Buchs et al. |
| 4,386,989 A | 6/1983 | Aubry |
| 4,650,401 A | 3/1987 | Yao et al. |

(Continued)

FOREIGN PATENT DOCUMENTS

| CA | 2042532 | 12/1991 |
| CA | 2320606 | 3/2001 |

(Continued)

OTHER PUBLICATIONS

Extended European Search Report for European Application No. 13400037.1, Completed by the European Patent Office, dated May 15, 2014, 8 Pages.

(Continued)

*Primary Examiner* — Justin Seabe
*Assistant Examiner* — Jason Mikus
(74) *Attorney, Agent, or Firm* — Brooks Kushman P.C.

(57) ABSTRACT

A beam for a rotorcraft rotor and particularly to a helicopter rotor. Said beam comprises a hub connection portion, a blade connection portion, a first flexure portion located between the hub connection portion and the blade connection portion and having a bending stiffness about a first axis which is orthogonal to the longitudinal axis of the blade, said bending stiffness being smaller than that of the hub connection portion and that of the blade connection portion and a shear portion located between the hub connection portion and the blade connection portion and having a shear stiffness parallel to a second axis which is orthogonal to the longitudinal axis of the blade and non-parallel to the first axis. Said shear stiffness is smaller than that of the hub connection portion and that of the blade connection portion.

16 Claims, 2 Drawing Sheets

(56) References Cited

U.S. PATENT DOCUMENTS

| | | | |
|---|---|---|---|
| 4,676,720 A * | 6/1987 | Niwa | B64C 27/51 |
| | | | 416/134 A |
| 4,690,615 A | 9/1987 | Kuntze-Fechner et al. | |
| 4,746,272 A | 5/1988 | Noehren et al. | |
| 4,898,515 A | 2/1990 | Beno et al. | |
| 5,286,167 A * | 2/1994 | Byrnes | B64C 27/33 |
| | | | 416/134 A |
| 5,358,381 A | 10/1994 | Covington et al. | |
| 5,431,538 A * | 7/1995 | Schmaling | B29C 70/202 |
| | | | 416/134 A |
| 7,275,913 B2 | 10/2007 | Becker et al. | |
| 7,384,238 B2 | 6/2008 | Becker et al. | |
| 8,821,128 B2 | 9/2014 | Bianchi et al. | |
| 2003/0086786 A1* | 5/2003 | Mochida | B64C 27/33 |
| | | | 416/134 A |
| 2004/0146403 A1* | 7/2004 | Yasui | B64C 27/33 |
| | | | 416/134 A |
| 2006/0165527 A1 | 7/2006 | Stamps et al. | |

FOREIGN PATENT DOCUMENTS

| | | |
|---|---|---|
| CA | 2650760 | 7/2009 |
| CN | 102167156 | 8/2011 |
| DE | 2917301 | 10/1980 |
| DE | 3534968 | 2/1987 |
| DE | 19915085 | 12/1999 |
| DE | 10316093 | 11/2004 |
| EP | 0097885 | 1/1984 |
| EP | 0155444 | 9/1985 |
| EP | 1431176 | 6/2004 |
| FR | 2041747 | 2/1971 |
| FR | 2474395 | 7/1981 |
| JP | 6121894 | 1/1986 |
| JP | 2010143484 | 7/2010 |
| WO | 2004089748 | 10/2004 |

OTHER PUBLICATIONS

Website. http://en.wikipedia.org/wiki/Second_moment_of_area Wikipedia Article, English Translation attached to origianl, Retrieved on Jun. 6, 2014, All together 13 Pages, "Second Moment of Area."
Daniel Gay, 2nd Edition Hermes/Lavoisier, Cachan, France, 1989, 5 Pages, "Materiaux Composites."

* cited by examiner

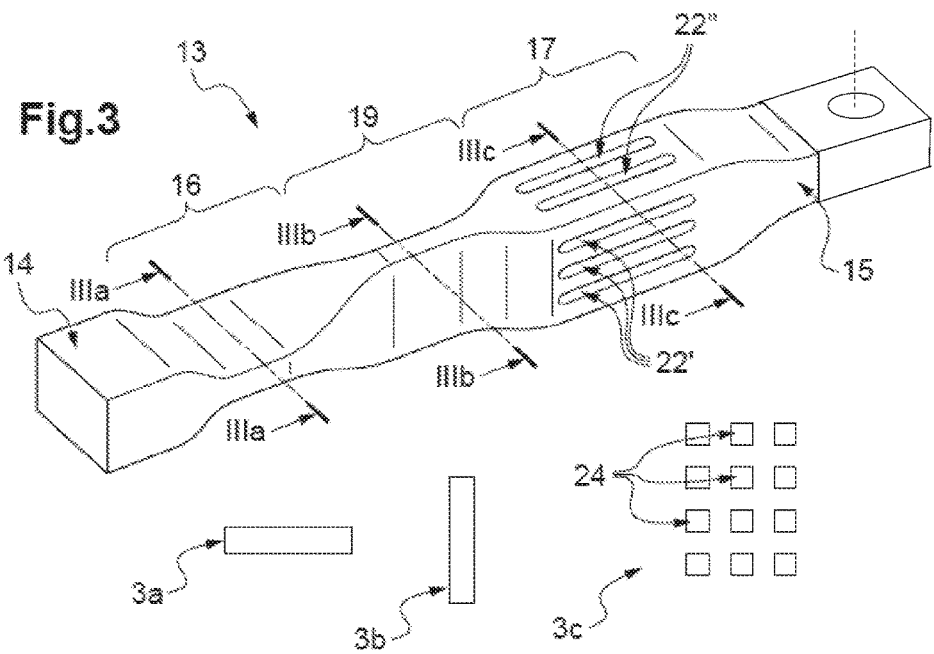
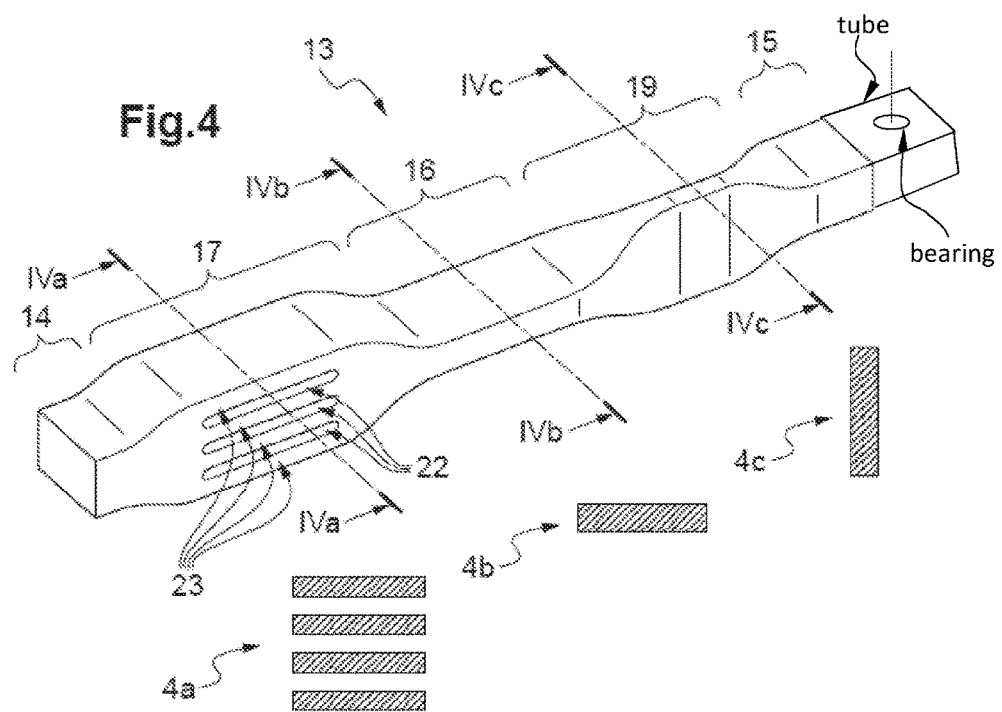

BEAM FOR A ROTORCRAFT ROTOR AND ROTORCRAFT ROTOR

CROSS REFERENCE TO RELATED APPLICATION

This application claims priority to European patent application No. EP 13 400037.1 filed on Dec. 10, 2013, the disclosure of which is incorporated in its entirety by reference herein.

BACKGROUND OF THE INVENTION (1) Field of the Invention

The invention relates to a beam for a rotorcraft rotor and particularly to a helicopter rotor.

(2) Description of Related Art

In general, a rotorcraft is an aircraft that differs from other powered aircrafts mainly in their ability to fly both at high cruising speeds and to fly at low speeds or to hover. This ability is obtained by providing the rotorcraft with at least one main rotor having an axis that is substantially vertical.

The main rotor comprises a rotary wing that provides the rotorcraft with lift and possibly also with thrust and control moments. The control of the rotorcraft in flight is facilitated by varying the cyclic and/or collective pitch of the blades of the rotary wing.

Conventionally, a rotorcraft includes in principle a group of engines comprising at least one fuel-burning engine such as a piston engine or a turbine engine. A gearbox connects the group of engines to a hub of the main rotor, a number of rotor blades and a corresponding number of beams connecting each blade with the hub.

During operation, the rotor must on the one hand resist the lift, drag, centrifugal forces (and corresponding moments) of the blades that apply during rotation, and on the other hand must permit the flapping motions, torsion or pitch motions and lead/lag motions of the blades.

The many different systems utilized for this task are variations on basic designs, such as so-called articulated rotors and hingeless rotors. The articulated rotor utilizes rigid beams equipped with hinges and bearings to facilitate the aforementioned blade motions. The bearingless rotor comprises special composite material beams, so-called flexbeams that are flexible enough to bend and twist to allow blade movement without bearings and additional mechanics.

In a bearingless rotor, the function of discrete hinges and bearings is performed by structures which are weak against bending and/or torsion in certain areas or portions of the beam, but which of course transfer all the loads (lift and drag (shear forces), centrifugal forces), bending and twisting moments, and so forth. An equivalent or virtual offset of a flap hinge, lead lag hinge and pitch hinge from the rotation axis of the hub and output shaft is defined for such bearingless rotors.

Hingeless rotors are distinguished from bearingless rotors by a flexible beam to connect each blade to the rotor hub, the connection using conventional pitch bearings (metallic bearings or bearings with composite materials).

The document U.S. Pat. No. 5,286,167 describes a flexbeam helicopter rotor having a connection between the flexbeam and the hub to allow a blade flapping motion only around a flapping axis. The blade flapping motion is obtained at the location of the connection between the flexbeam and the hub. A load decoupling permits the use of a thinner flexbeam spar with the attendant advantage of rotor weight and size reduction, and the additional advantage of a reduced flapping hinge effecting offset, or flapping axis.

The document DE19915085 discloses a rotor blade mounting for a helicopter with a flexbeam between the rotor head and the rotor blade and with a rigid control sleeve connected to the rotor blade at the end of the flexbeam. Compact damper units are fitted between the end of the flexbeam and the rotor blade, straddling the flexbeam/blade connection and inside the control sleeve. The damping elements comprise interlaced plates connected to the rotor blade and to the damping sleeve and separated by elastomer layers.

The document U.S. Pat. No. 4,746,272 relates to helicopter rotor design and, more particularly, to flexbeams, and describes a flexbeam having a hub portion, a flap flexure portion outboard of the hub portion, a lag-torsion flexure portion outboard of the flap flexure portion, and a blade attachment portion outboard of the lag-torsion portion, and having fibers of composite material extending longitudinally the length of the flexbeam, wherein a plurality of longitudinal lobes defined by a plurality of radiused grooves extending into the lag-torsion flexure portion of the flexbeam from the upper and lower surfaces of the lag-torsion flexure portion to a central planar portion of the lag-torsion flexure portion, the grooves being radiused at their bases to enhance the torsion flexure characteristics of the lag-torsion flexure portion.

Other prior art documents were considered for drafting the application, i.e.: CA2042532, CA2320606, CA2650760, CN102167156, DE10316093, DE2917301, DE3534968, EP0155444, EP0097885, EP1431176, FR2474395, FR2041747, JP61021894, JP2010143484, U.S. Pat. No. 4,650,401, U.S. Pat. No. 4,746,272, U.S. Pat. No. 4,898,515, U.S. Pat. No. 5,358,381, US2004/0146403, US2006/0165527 and WO200489748.

BRIEF SUMMARY OF THE INVENTION

It is an object of the present invention to reduce the virtual hinge offset in hingeless rotors and bearingless rotors.

This object is achieved by a beam according to claim 1 and a rotor according to claim 14. Advantageous embodiments are described in the subclaims.

According to a first aspect, the invention suggests a beam for a rotorcraft rotor with a hub and at least two blades. One beam is provided for each blade. Said beam comprises:

a hub connection portion for connecting the beam to a hub of the rotor;

a blade connection portion for connecting the beam to a blade of the rotor;

a first flexure portion located between the hub connection portion and the blade connection portion and having a bending stiffness about a first axis which is orthogonal to the longitudinal axis of the blade—when connected to the beam—, said bending stiffness being smaller than that of the hub connection portion and that of the blade connection portion about the first axis;

a shear portion located between the hub connection portion and the blade connection portion and having a shear stiffness parallel to a second axis which is orthogonal to the longitudinal axis of the blade—when connected to the beam—and non-parallel, preferentially orthogonal to the first axis, said shear stiffness being smaller than that of the hub connection portion and that of the blade connection portion, in order to change the location of the virtual hinge that corresponds to the first flexure portion.

This invention applies to both: The flexbeam of the main rotor and the flexbeam of a tail rotor of a helicopter, or other secondary rotors.

If a force acts onto such a suggested beam in a direction orthogonal to the longitudinal axis of the blade and to the first axis, then the first flexure portion reacts by bending or flexing to form a simple bow or arch, and the shear portion reacts by bending or flexing to form an S-shape. Said bowed or arched deformation results in a rotation of the blade connection portion and the blade connected thereto, whereas said S-shaped deformation results in a parallel shift or translation of the blade connection portion and the blade connected thereto towards the rotation axis of the hub and output shaft. Thus, the corresponding virtual hinge offset of the first flexure portion is reduced as compared to a conventional beam without such shear portion.

Preferably, said bending stiffness of the first flexure portion about the first axis is smaller than any other bending stiffness of the first flexure portion about an axis which is orthogonal to the longitudinal axis of the blade—when connected to the beam—and non-parallel to the first axis.

Preferably, the rotorcraft rotor is a helicopter rotor.

The beam may be designed for instance comprising at least one other portion and/or at least one further shear portion. Each of such further shear portions may for instance have a shear stiffness parallel or non-parallel to said second axis.

The flexure portion may for instance comprise an inboard end connected to the hub connection portion, and an outboard end connected to the blade connection portion.

The shear portion may for instance comprise an inboard end connected to the hub connection portion, and an outboard end connected to the blade connection portion.

It may be provided that the first flexure portion is closer to the hub connection portion than the shear portion, or vice versa.

In said first alternative, said inboard end of the flexure portion may adjoin to the hub connection portion, said outboard end of the flexure portion may adjoin to said inboard end of the shear portion, and said outboard end of the shear portion may adjoin to the blade connection portion. Thus, the flexure portion is connected directly with its inboard end to the hub connection portion and indirectly, namely via the shear portion, with its outboard end to the blade connection portion, whereas the shear portion is connected directly with its outboard end to the blade connection portion and indirectly, namely via the flexure portion, to the hub connection portion.

In said second alternative, said inboard end of the shear portion may adjoin to the hub connection portion, said outboard end of the shear portion may adjoin to said inboard end of the flexure portion, and said outboard end of the flexure portion may adjoin to the blade connection portion. Thus, the shear portion is connected directly with its inboard end to the hub connection portion and indirectly, namely via the flexure portion, with its outboard end to the blade connection portion, whereas the flexure portion is connected directly with its outboard end to the blade connection portion and indirectly, namely via the shear portion, to the hub connection portion.

It may be provided that at least a part of the first flexure portion forms at least a part of the shear portion and/or the first flexure portion overlaps the shear portion and/or continuously merges into the shear portion.

It may be provided that:
the first flexure portion is a flap portion and the bending stiffness is a flap stiffness and the first axis is the flap axis which is orthogonal to the rotation axis of the hub—when connected to the beam, or
the first flexure portion is a lead/lag portion and the bending stiffness is a lead/lag stiffness and the first axis is the lead/lag axis which is parallel to the rotation axis of the hub—when connected to the beam.

It may be provided that the beam further comprises:
a second flexure portion located between the hub connection portion and the blade connection portion and having a bending stiffness about a third axis which is orthogonal to the longitudinal axis of the blade—when connected to the beam—and non-parallel, preferably orthogonal to the first axis, said bending stiffness being smaller than the bending stiffness of the hub connection portion about the third axis and the bending stiffness of the blade connection portion about the third axis and the bending stiffness of the first flexure portion about the third axis.

Preferably, the bending stiffness of the first flexure portion about the first axis is smaller than the bending stiffness of the second flexure portion about the first axis.

Preferably, said bending stiffness of the second flexure portion about the third axis is smaller than any other bending stiffness of the second flexure portion about an axis which is orthogonal to the longitudinal axis of the blade—when connected to the beam—and non-parallel to the third axis.

The flexure portions may be designed for instance in such a manner that:
if the first flexure portion is a flap portion, the second flexure portion is a lead/lag portion and its bending stiffness about the third axis is a lead/lag stiffness and the third axis is the lead/lag axis which is parallel to the rotation axis of the hub—when connected to the beam—, or
if the first flexure portion is a lead/lag portion, the second flexure portion is a flap portion and its bending stiffness about the third axis is a flap stiffness and the third axis is the flap axis which is orthogonal to the rotation axis of the hub—when connected to the beam—.

It may be provided that:
the second flexure portion is closer to the hub connection portion than the shear portion, or vice versa; and/or
the second flexure portion is closer to the hub connection portion than the first flexure portion, or vice versa.

It may be provided that:
at least a part of the second flexure portion forms at least a part of the shear portion and/or the second flexure portion overlaps the shear portion and/or continuously merges into the shear portion; and/or
at least one torsion portion located between the hub connection portion and the blade connection portion and having a torsion stiffness about the longitudinal axis of the blade—when connected to the beam—, said torsion stiffness being smaller than that of the hub connection portion and that of the blade connection portion and that of the first flexure portion; and/or
at least a part of the shear portion forms at least a part of the torsion portion and/or the torsion portion overlaps the shear portion and/or continuously merges into the shear portion.

The blade connection portion may for instance be linked to a bearing via a rod or tube of high bending stiffness and high shear stiffness, said bearing being arranged nearby the virtual flap hinge of the beam.

This arrangement may solve the problem if the bearing of the blade should be elastically-statically under-determined in case of certain combinations of low bending stiffness portions and low shear stiffness portions. Further, said rod or tube may be used to trigger or induce or set or change the pitch or attack angle of the blade.

It may be provided that:

at least one groove extends into the shear portion in a direction which is orthogonal to the longitudinal axis of the blade—when connected to the beam—and the second axis, and/or in a plane normal to the second axis; and/or at least one slot extends through the shear portion in a direction which is orthogonal to the second axis, and/or in a plane normal to the second axis.

Each of the grooves may be designed for instance in such a manner that the remaining material at the bottom of the groove has a low shear stiffness, but can sustain a large shear strain. Preferably, said remaining material is an elastomer.

Each of the grooves and slots may be designed for instance in such a manner that, if the first flexure portion is a flap portion, the respective groove or slot extends from the leadside or lagside surface of the shear portion and in a plane normal to the rotation axis of the hub and output shaft, or that, if the first flexure portion is a lead/lag portion, the respective groove or slot extends from the upper or lower surface of the shear portion and in a plane parallel to the rotation axis of the hub and output shaft and to the longitudinal axis of the blade.

It may be provided that at least one of the grooves and/or at least one of the slots is filled with a material having a shear modulus smaller than that of the material of the shear portion.

This material may for instance be an elastomer.

In a second aspect, the invention suggests a rotorcraft rotor, comprising:

a beam according to the first aspect of the invention;

a hub with a beam connection portion connected to the hub connection portion of said beam;

a blade with a beam connection portion connected to the blade connection portion of said beam.

Preferably, the rotorcraft rotor is a helicopter rotor.

The rotor may be designed for instance comprising at least one further such beam and/or at least one further such blade, and the hub may comprise at least one further such beam connection portion.

It may be provided that:

the beam connection portion of the hub is attached to or integral with the hub connection portion; and/or the beam connection portion of the blade is attached to or integral with the blade connection portion.

The features of one of the embodiment of the invention, not being particular features, may appropriately apply also to the other embodiments of the invention.

In the following, preferred embodiments and examples of the invention will exemplarily be explained in more detail with respect to the appending drawings. The particular features resulting thereof are not restricted to the particular embodiments and examples, but may be combined with one or more particular features described or mentioned above and/or with one or more particular features of other embodiments or examples.

BRIEF DESCRIPTION OF THE SEVERAL VIEWS OF THE DRAWINGS

The details shown in the drawings are only of explanatory nature and shall not be construed in any restrictive manner.

FIG. 3 is a perspective view of a beam in a third embodiment; and

FIG. 4 is a perspective view of a beam in a fourth embodiment.

DETAILED DESCRIPTION OF THE INVENTION

Figure 1:
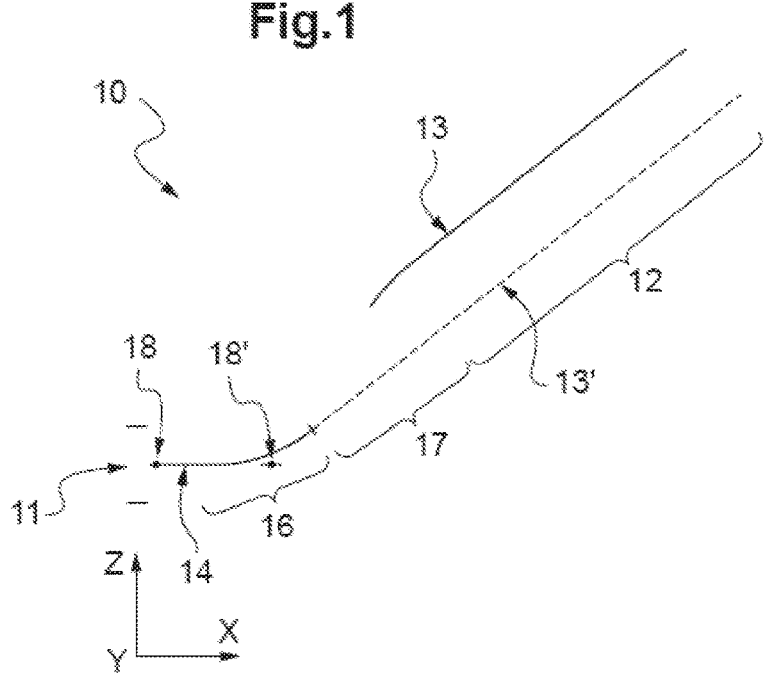
FIG. 1 is a side view of a part of a rotor, e.g. for a rotary wing aircraft like a helicopter, comprising a beam in a first embodiment.

In FIG. 1, a rotorcraft rotor, particularly a rotor 10 in a preferred embodiment is schematically depicted. This rotor 10 comprises a hub 11 with a rotation axis Z, a number of blades 12, and a corresponding number of beams 13 in a first embodiment. For the sake of clarity, only one of the blades 12 and one of the beams 13 is shown. X refers to a radially outward direction with respect to the rotation axis Z, said X-direction being parallel to the longitudinal axis of the shown blade 12 when rotating horizontally about the vertical rotation axis Z. As shown on FIGS. 1-4, the beam 13 of the invention is a unitary composite structure, i.e. is depraved from any detachable subpart as e.g. a mechanical dismountable hinge or the like. Though, the integral beam 13 of the invention includes so called discrete hinges and bearings that are performed by locally changing the shape of the structure of the beam 13.

The following terms are used with the definitions as indicated:

Bending stiffness:

$By\_beam$ designates the Bending stiffness of the "bendingsoft" beam about the y-axis.

$Bz\_beam$ designates the Bending stiffness of the "bendingsoft" beam about the z-axis.

$By\_head$ designates the Bending stiffness of the rotorhead connection about the y-axis.

$Bz\_head$ designates the Bending stiffness of the rotorhead connection about the z-axis.

$By\_blade$ designates the Bending stiffness of the rotorblade about the y-axis.

$Bz\_blade$ designates the Bending stiffness of the rotorblade about the z-axis.

$By\_sheet$ designates the Bending stiffness of one sheet of the beam about the y-axis. $Bz\_sheet$ designates the Bending stiffness of one sheet of the beam about the z-axis.

Torsion stiffness:

$Tx\_beam$ designates the Torsion stiffness of the beam about the x-axis.

$Tx\_head$ designates the Torsion stiffness of the rotorhead connection about the x-axis.

$Tx\_blade$ designates the Torsion stiffness of the rotorblade about the x-axis.

$Tx\_sheet$ designates the Torsion stiffness of one sheet of the beam about the x-axis.

Relations:

$$3*By\_sheet < By\_beam < By\_head$$

$$By\_beam < By\_blade$$

$$By\_beam < Bz\_beam$$

$$2*By\_sheet < Bz\_beam < Bz\_head$$

$$Bz\_beam < Bz\_blade$$

$3*Tx\_sheet < Tx\_beam < Tx\_head$ $Tx\_beam < Tx\_blade.$

Typical ranges of values: Ranges of values for By_beam (with reference to a standard length of 1 m) for a helicopter with 2.5 to 5 tons of maximum weight at take-off are e.g.:

$1*10^2 \text{ Nm}^2 < By\_beam < 5*10^5 \text{ Nm}^2$ $5*10^2 \text{ Nm}^2 < Bz\_beam < 5*10^6 \text{ Nm}^2$ $1*10^1 \text{ Nm}^2 < Tx\_beam < 5*10^5 \text{ Nm}^2$ $2*10^4 \text{ Nm}^2 < By\_head < 1*10^8 \text{ Nm}^2$ $2*10^4 \text{ Nm}^2 < Bz\_head < 1*10^8 \text{ Nm}^2$ $1*10^3 \text{ Nm}^2 < Tx\_head < 5*10^8 \text{ Nm}^2$ $5*10^3 \text{ Nm}^2 < By\_blade < 5*10^7 \text{ Nm}^2$ $5*10^3 \text{ Nm}^2 < By\_blade < 5*10^7 \text{ Nm}^2$ $1*10^4 \text{ Nm}^2 < Tx\_blade < 5*10^8 \text{ Nm}^2.$ The stiffness values can be considerably less for small helicopters, e. g. model helicopters or helicopter drones with less than 2.5 tons maximum weight at take-off. The stiffen values can be higher for big helicopters with more than 5 tons maximum weight at take-off.

The beam 13 comprises a hub connection portion 14 for connecting the beam 13 to the hub 11, a blade connection portion 15 for connecting the beam 13 to the blade 12, a first flexure portion or flap portion 16 located between the hub connection portion 14 and the blade connection portion 15, and a shear portion 17 located between the hub connection portion 14 and the blade connection portion 15. The beam 13 ends at the end of the shear portion 17. As shown on FIG. 2, the hub connection portion 14 and the blade connection portion 15 are opposed one to the other, generally along longitudinal axis X when the beam 13 is at rest. The hub connection portion 14 thus defines one end of the beam 13 and the blade connection portion 15 defines the other end.

The flap portion 16 has a bending stiffness or flapping stiffness BSy16 about a first axis, said first axis being parallel to a direction Y of the relative movement of the blade 12 and beam 13 with respect to the surrounding air and thus orthogonal to the longitudinal axis of the beam 13 and the blade 12 and to the rotation axis Z. This flapping stiffness BSy16 is smaller than the flapping stiffness or bending stiffness BSy14 of the hub connection portion 14 about the first axis, the flapping stiffness or bending stiffness BSy15 of the blade connection portion 15 about the first axis, and the flapping stiffness or bending stiffness BSy17 of the shear portion 17 about the first axis:

$BSy16 < BSy14, BSy16 < BSy15, BSy16 < BSy17.$

For each of these portions 14-17, the corresponding flapping stiffness BSy can be calculated according to:

$BSy = E \cdot Iyy.$

The above is to be considered if the respective portion is made of a single and/or homogeneous material, where E is the elastic modulus of the material of the respective portion, and Iyy is the second moment of area of the cross section of the respective portion i.e. the moment of inertia about a first axis also a principal axis of inertia, parallel to the y axis, of each cross section of the respective portion. For example in FIG. 2, Iyy is the moment of inertia about the first axis yy which is a principal axis of inertia of the cross section Ax (cut in a plane parallel to y-z-plane) of the first flexure portion 16 or flap portion (flapping moment about the yy axis). The first axis yy is orthogonal to the axis/direction Z but is parallel to the axis/direction Y.

If the respective portion is made of at least two different materials or of a composite material, the calculation of BSy is more complex (e.g. cf. "Matériaux Composites", Daniel GAY, $2^{nd}$ Edition, Hermés/Lavoisier, Cachan, France, 1989; page 313).

In a first variant so that the first flexure portion 16 is a lead/lag portion, the first axis of inertia, also principal axis of inertia, of each cross section is parallel to the z axis. For example in FIG. 2, Iyy becomes Izz in this case, i.e. the moment of inertia of the cross section axis about the zz axis (parallel to the z axis).

The shear portion 17 has a shear stiffness SSz17 parallel to a second axis z'z' (i.e. the axis of the shear force), said second axis being parallel to the rotation axis Z and thus orthogonal to the longitudinal axis X13 of the beam 13 and the blade 12 and non-parallel, namely orthogonal, to the first axis. This shear stiffness SSz17 is smaller than the shear stiffness SSz14 of the hub connection portion 14 parallel to the second axis, and smaller than the shear stiffness SSz15 of the blade connection portion 15 parallel to the second axis, and the shear stiffness SSz16 of the flap portion 16 parallel to the second axis:

$SSz17 < SSz14, SSz17 < SSz15, SSz17 < SSz16$

For each of these portions 14-17, the corresponding shear stiffness SSz can be calculated according to:

$SSz = G \cdot Az.$

The above is to be considered if the respective portion has a compact solid cross section and is made of a single and/or homogeneous material, where: G is the shear modulus of the material of the respective portion, and Az is the area (also the reduced cross area) of the cross section of the respective portion, said cross section having been cut in a Y-Z-plane. For example in FIG. 2, the shear stiffness SSz17 is relating to the cross section Az, orthogonal to said X-direction and parallel to the second axis z'z' (e.g. cf. "Matériaux Composites", Daniel GAY, $2^{nd}$ Edition, Hermés/Lavoisier, Cachan, France, 1989; page 313).

In this first embodiment of the beam 13, the flap portion 16 adjoins with its inboard end to the hub connection portion 14, the shear portion 17 adjoins with its outboard end to the blade connection portion 15, and the outboard end of the flap portion 16 adjoins to the inboard end of the shear portion 17. Thus, the flap portion 16 is closer to the hub connection portion 14 than the shear portion 17 and is connected directly to the hub connection portion 14 and indirectly, namely via the shear portion 17, to the blade connection portion 15, whereas the shear portion 17 is connected directly to the blade connection portion 15 and indirectly, namely via the flap portion 16, to the hub connection portion 14.

If an upward force or combination of moment and force, i.e. a force in Z-direction and thus orthogonal to the longitudinal axis of the beam 13 and the blade 12 and to the first axis and Y-direction, acts onto the blade 12, this force is transferred to the beam 13. The flap portion 16 reacts by bending or flexing upwardly to form a simple bow or arch, and the shear portion reacts by bending or flexing to form an S-shape, as schematically shown in FIG. 1. Said bowed or arched deformation results in a rotation of the blade connection portion 15 and the blade 12 connected thereto, whereas said S-shaped deformation results in a parallel shift or translation of the blade connection portion 15 and the blade 12 connected thereto towards the rotation axis Z11 of the hub 11.

Thus, the corresponding location of the virtual flap hinge 18 of the beam 13 is much closer to the hub 11 than the location of a virtual flap hinge 18' of a conventional beam 13' without such shear portion, as indicated by a broken line. In other words, the respective virtual flap hinge offset of the beam 13 is smaller than that of the conventional beam 13'.

Figure 2:
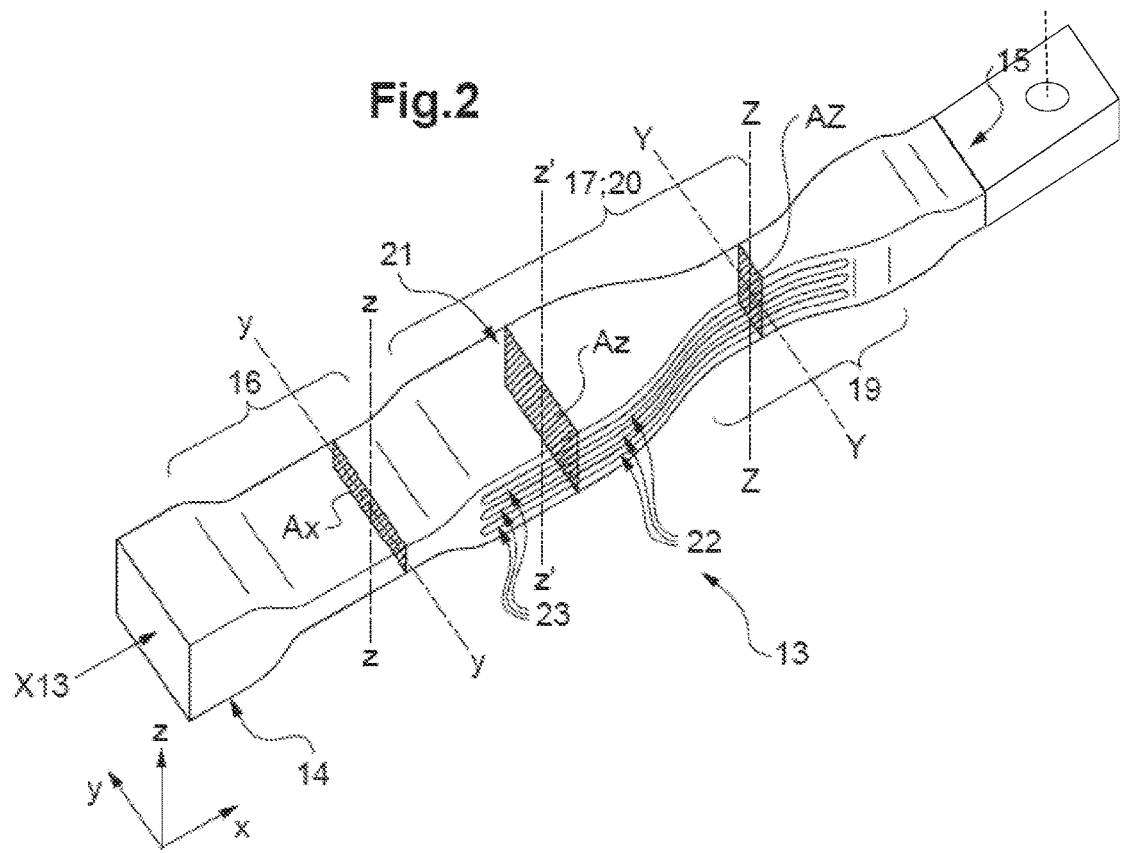
FIG. 2 is a perspective view of a beam in a second embodiment.

In FIG. 2, there is depicted a second embodiment of a beam 13 for connecting a not shown blade, such as blade 12 in FIG. 1, of a not shown helicopter rotor, such as rotor 10 in FIG. 1, to a not shown hub, such as hub 11 in FIG. 1, of the rotor. This embodiment resembles the first embodiment of the beam 13 so that in the following, merely the respective differences will be explained more extensively.

In this second embodiment, the beam 13 further comprises a second flexure portion or lead/lag portion 19 and a torsion portion 20. The shear portion 17 comprises an outboard portion 19 adjoining with its outboard end to the blade connection portion 15, and an inboard portion 21 adjoining with its outboard end to the inboard end of the outboard portion 19 and with its inboard end to the outboard end of the flap portion 16. The lead/lag portion 19 forms a part of the shear portion 17, namely the outboard portion 19, and the shear portion 17 forms the torsion portion 20. Thus, the flap portion 16 is closer to the hub connection portion 14 than the lead/lag portion 19 and the torsion portion 20.

The lead/lag portion 19 has a bending stiffness or lead/lag stiffness $BSz19$ about a third axis, said third axis being parallel to the rotation axis Z and thus orthogonal to the longitudinal axis X13 of the beam 13—as well as to the longitudinal axis X of the blade 12 when connected to the beam 13—and non-parallel, namely orthogonal, to the first axis and Y-direction.

This lead/lag stiffness $BSz19$ is smaller than the bending stiffness or lead/lag stiffness $BSz14$ of the hub connection portion 14 about the third axis, the bending stiffness or lead/lag stiffness $BSz15$ of the blade connection portion 15 about the third axis, the bending stiffness or lead/lag stiffness $BSz16$ of the flap portion 16 about the third axis, and the bending stiffness or lead/lag stiffness $BSz21$ of the inboard portion 21 about the third axis:

$$BSz19<BSz14, BSz19<BSz15, BSz19<BSz16,$$
$$BSz19<BSz21$$

For each of these portions 14-16, 19, 21, the corresponding lead/lag stiffness BSz can be calculated according to:

$$BSz=E \cdot Izz$$

If the respective portion is made of a single and/or homogeneous material, where E is the elastic modulus of the material of the respective portion, and Izz is the second moment of area of the cross section of the respective portion i.e. the moment of inertia about the third axis, also a principal axis of inertia, parallel to the z axis, of each cross section of the respective portion. For example in FIG. 2, Izz is the moment of inertia about the third axis ZZ which is a principal axis of inertia of the cross section AZ (cut in a plane parallel to y-z-plane) of the second flexure portion 19 or lead/lag portion (lead/lag moment about the ZZ axis) (e.g. cf. "Matériaux Composites", Daniel GAY, $2^{nd}$ Edition, Hermes/Lavoisier, Cachan, France, 1989; page 313).

Further, the lead/lag portion 19 has a bending stiffness or flapping stiffness $BSy19$ about a fourth axis YY, parallel to the Y direction, which is greater than the flapping stiffness $BSy16$ of the flap portion 16:

$$BSy16<BSy19.$$

For this portion 19, the corresponding flapping stiffness BSy can be calculated according to the above formula:

$$BSy=E \cdot yy.$$

The above is to be considered if the respective portion is made of a single and/or homogeneous material, where E is the elastic modulus of the material of the respective portion, and Iyy is the second moment of area of the cross section of the respective portion i.e. the moment of inertia about a fourth axis, also a principal axis of inertia, parallel to Y direction, of each cross section of the respective portion. In FIG. 2, YY axis is the fourth axis, a principal axis of inertia of the cross section AZ of the second flexure portion or lead/lag hinge, portion (lead/lag moment about the ZZ axis).

In the first variant where the second flexure portion is a flap portion, the YY axis is the third axis, also a principal axis of inertia of the cross section AZ. So, the lead/lag stiffness $BSz16$ of the lead/lag portion 16 is smaller than the lead/lag stiffness $BSz19$ about the ZZ axis. Likewise, the $BSy19$ bending stiffness (about the YY axis) is smaller than the bending stiffness $BSy16$ (about the yy axis).

The torsion portion 20 has a torsion stiffness $TSz20$ about the longitudinal axis X13. This torsion stiffness $TSz20$ is smaller than the torsion stiffness $TSz14$ of the hub connection portion 14 about the longitudinal axis X13, the torsion stiffness $TSz15$ of the blade connection portion 15 about the longitudinal axis X13, and the torsion stiffness $TSz16$ of the flap portion 16 about the longitudinal axis X13:

$$TSz20<TSz14, TSz20<TSz15, TSz20<TSz16$$

For each of these portions 14-16, 20, the corresponding torsion stiffness TSz (said also equivalent rigidity in torsion) can be calculated according to:

$$TSz=G \cdot It.$$

The above is to be considered if the respective portion is made of a single and/or homogeneous material, where G is the shear modulus of the material of the respective portion, and It is the torsion constant (said sometimes "fictitious inertia" and also J) of the cross section of the respective portion, said cross section having been cut in a Y-Z-plane (e.g. cf. "Matériaux Composites", Daniel GAY, $2^{nd}$ Edition, Hermes/Lavoisier, Cachan, France, 1989; page 338).

In the drawn Cartesian coordinate system, the X-axis refers to the direction of the longitudinal axis X13—as well as to the direction X of the longitudinal axis of the blade 12 when connected to the beam 13—, the Z-axis refers to the direction of the rotation axis of the hub 11 and the overall rotor 10, and the Y-axis refers to the direction of the relative movement of the blade 12 and beam 13 with respect to the surrounding air.

Of course in a second variant not shown, the second flexure portion 19 can be closer to the hub connection portion 14 than the shear portion 17.

The cross sections of the beam 13 normal to the longitudinal axis X13 are essential rectangular with varying width, as measured in the Y-direction, and height, as measured in the Z-direction. The hub connection portion 14, the flap portion 16 and the inboard portion 21 have the same first width, whereas the hub connection portion 14, the shear portion 17—and thus the torsion portion 20—and the inboard end of the blade connection portion 15 have the same first height. The blade connection portion 15 has a second width smaller than the first width, and has at its outboard end a second height smaller than the first height.

The flap portion 16 has a third height smaller than the first height, the first width, the second height and the second width, resulting in a reduced second moment of area Iyy and thus a reduced flapping stiffness BSy as compared with the hub connection portion 14, the shear portion 17—and thus the torsion portion 20—and the blade connection portion 15. The flap portion 16 is designed in such a manner that its flexural strength still meets the requirements.

The lead/lag portion 19 has a third width smaller than the first width, the first height and the second width, resulting in a reduced second moment of area Izz and thus a reduced lead/lag stiffness BSz as compared with the hub connection portion 14, the flap portion 16, the inboard portion 21 and the blade connection portion 15.

In this second embodiment, three plane slots 22 extend through the shear portion 17 in parallel, equally spaced X-Y-planes normal to the rotation axis Z, and the second axis. The slots 22 extend from the leadside surface to the lagside surface of the shear portion 17. Thus, the shear portion 17 comprises four plane, parallel, equally spaced sheets 23 separated by said three slots 22.

This results on the one hand in a reduced Az with only a small part of reduced shear stiffness SSz as compared with the hub connection portion 14, the flap portion 16 and the blade connection portion 15. Most of the reduction in shear stiffness comes from the 3D-Effect, namely through an s-shaped deformation of section 17 low bending stiffnesses in the sheets 23 cause a low shear stiffness of the section 17. In other words, this design of the shear portion 17 results in a 3D effect which allows for the aforementioned S-shaped deformation which results in a greatly reduced shear stiffness. The 3D-Effect is the following: The individual lamella 23 have a low bending stiffness, but they are connected to each other on both ends of the shear portion 17, so the total bending stiffness of the shear portion 17 is high (Steiner share).

Under a lateral force (shear force) at one end 17 the lamellae are individually bent one way, and then the other way (S-Shape). This leads to a large lateral shift of the end where the force applies. So local bending of the individual lamella leads to a global shear deformation. Then a low bending stiffness of the individual lamella leads to a low shear stiffness of the whole stack of lamella. This is also the reason, why slots are required, and groves are not sufficient, unless the remaining material at the bottom of the groves has a low shear stiffness and can sustain large shear deformations. The shear portion 17 is designed in such a manner that it still bears the expected maximal centrifugal forces and flap and lead/lag moments.

This results on the other hand in a reduced torsion constant It and thus a reduced torsion stiffness TSz as compared with the hub connection portion 14, the flap portion 16 and the blade connection portion 15.

Although each sheet 23 has a very low individual flapping stiffness BSyy due to its low individual height, the bundle or package of these sheets 23 which are fixedly connected with their inboard and outboard ends to the outboard end of the flap portion 16 and the inboard end of the blade connection portion 15, respectively, has a high overall flapping stiffness BSyy due to the Steiner amounts or Steiner terms of the individual sheets 23 (cf. article "Second moment of area" on the Internet URL page: http://en.wikipedia.org/wiki/Second_ moment_of_area).

In FIG. 3, there is depicted a third embodiment of a beam 13 for connecting a not shown blade, such as blade 12 in FIG. 1, of a not shown helicopter rotor, such as rotor 10 in FIG. 1, to a not shown hub, such as hub 11 in FIG. 1, of the rotor. This embodiment resembles the second embodiment of the beam 13 so that in the following, merely the respective differences will be explained more extensively.

In this third embodiment, the lead/lag portion 19 does not form a part of the shear portion 17 but is arranged separately from the shear portion 17 in such a manner that the shear portion 17 adjoins with its outboard end to the blade connection portion 15, and the lead/lag portion 19 adjoins with its inboard end to the outboard end of the flap portion 16 and with its outboard end to the inboard end of the shear portion 17. Thus, the lead/lag portion 19 is closer to the hub connection portion 14 than the shear portion 17.

At 3a, the cross sectional area of the flap portion 16 is shown as cut along line IIIa-IIIa. This cross sectional area 3a is a rectangle with its short side being parallel to the Z-axis and its long side being parallel to the Y-axis.

At 3b, the cross sectional area of the lead/lag portion 19 is shown as cut along line IIIb-IIIb. This cross sectional area 3b is a rectangle with its short side being parallel to the Y-axis and its long side being parallel to the Z-axis.

In this third embodiment, three plane slots 22' extend through the shear portion 17 in parallel, equally spaced X-Y-planes normal to the rotation axis Z and the second axis, and two plane slots 22" extend through the shear portion 17 in parallel, equally spaced X-Z-planes parallel to the rotation axis Z and normal to the direction Y and the first axis. The slots 22' extend from the leadside surface to the lagside surface of the shear portion 17, and the slots 22" extend from the upper surface to the lower surface of the shear portion 17. Thus, the shear portion 17 comprises twelve straight, parallel, equally spaced bars or rods 24 separated by said three slots 22' and said two slots 22" and each having a square cross sectional area. At 3c, the resulting cross sectional area of the shear portion 17 is shown as cut along line IIIc-IIIc. This cross sectional area 3c is a 3×4 rectangular pattern composed of the twelve square cross sectional areas of the rods 24.

This results in a low or reduced shear stiffness SSz parallel to the rotation axis Z and in a low or reduced shear stiffness SSy parallel to the direction Y, as compared with the hub connection portion 14, the flap portion 16, the lead/lag portion 19 and the blade connection portion 15.

In FIG. 4, there is depicted a fourth embodiment of a beam 13 for connecting a not shown blade, such as blade 12 in FIG. 1, of a not shown helicopter rotor, such as rotor 10 in FIG. 1, to a not shown hub, such as hub 11 in FIG. 1, of the rotor. This embodiment resembles the second embodiment of the beam 13 so that in the following, merely the respective differences will be explained more extensively.

In this fourth embodiment, the lead/lag portion 19 does not form a part of the shear portion 17 but is arranged separately from the shear portion 17 in such a manner that the lead/lag portion 19 adjoins with its outboard end to the blade connection portion 15, the shear portion 17 adjoins with its inboard end to the hub connection portion 14, and the flap portion 16 adjoins with its inboard end to the outboard end of the shear portion 17 and with its outboard end to the inboard end of the lead/lag portion 19. Thus, the shear portion 17 is closer to the hub connection portion 14 than the flap portion 16 and the lead/lag portion 19.

In this fourth embodiment, like in the second embodiment, three plane slots 22 extend through the shear portion 17 in parallel, equally spaced X-Y-planes normal to the rotation axis Z and the second axis. The slots 22 extend from the leadside surface to the lagside surface of the shear portion 17. Thus, the shear portion 17 comprises four plane, parallel, equally spaced sheets 23 separated by said three slots 22 and each having a rectangular cross sectional area. At 4a, the resulting cross sectional area of the shear portion 17 is shown as cut along line IVa-IVa. This cross sectional area 3c is a 1×4 rectangular pattern composed of the four rectangular cross sectional areas of the sheets 23.

This results in a low or reduced shear stiffness SSz parallel to the rotation axis Z as compared with the hub connection portion 14, the flap portion 16, the lead/lag portion 19 and the blade connection portion 15.

At 4b, the cross sectional area of the flap portion 16 is shown as cut along line IVbIVb. This cross sectional area 4b is a rectangle with its short side being parallel to the Z-axis and its long side being parallel to the Y-axis.

At 4c, the cross sectional area of the lead/lag portion 19 is shown as cut along line IVc-IVc. This cross sectional area 4c is a rectangle with its short side being parallel to the Y-axis and its long side being parallel to the Z-axis.

Naturally, numerous implementation variations may be made to the present invention. Although several embodiments are described above, it can readily be understood that it is not conceivable to identify exhaustively all of the possible embodiments. Naturally, it is possible to replace any described component with equivalent means without going beyond the ambit of the present invention.

Particularly, the yy and YY may be not strictly parallel themselves and parallel to Y axis, and the zz and ZZ may be not strictly parallel themselves and parallel to Z axis.

REFERENCE LIST 10 helicopter rotor
11 rotor hub
12 rotor blade
13/13' beam/conventional beam
14 hub connection portion of 13/13'
15 blade connection portion of 13/13'
16 flap portion of 13/13'
17 shear portion of 13
18, 18' location of virtual flap hinges of 13/13'
19 lead/lag portion of 13, outboard portion of 17
20 torsion portion of 13
21 inboard portion of 17
22,22',22" slots in 17
23 sheets of 17
24 rods of 17
X13 longitudinal axis of 13
X direction of X13
Y direction of relative movement of 12/13 with respect to the surrounding air
Z11 rotation axis of 11
Z direction of Z11

What is claimed is:

1. A beam for attaching a blade to a hub of a rotor for a rotorcraft, the blade having a longitudinal axis extending radially from a rotation axis of the hub, the beam comprising:
a hub connection portion for connecting the beam to the hub of the rotor;
a blade connection portion for connecting the beam to the blade of the rotor;
a first flexure portion located between the hub connection portion and the blade connection portion and adapted to bend about a first bending axis orthogonal to a longitudinal axis of the blade, a first bending stiffness of the first flexure portion being smaller than a bending stiffness of the hub connection portion and smaller than a bending stiffness of the blade connection portion;
a second flexure portion located between the hub connection portion and the blade connection portion and adapted to bend about a second bending axis, wherein the second bending axis is orthogonal to the longitudinal axis of the blade and non-parallel to the first bending axis, a second bending stiffness of the second flexure portion being smaller than the first bending stiffness of the first flexure portion;
a shear portion located between the hub connection portion and the blade connection portion and adapted to rotate about a shear axis, wherein the shear axis is orthogonal to the first bending axis and parallel to one of the rotation axis of the hub or the second bending axis of the blade;
at least one slot-shaped groove extending into the shear portion and at least a part of the second flexure portion in a direction parallel to one of the rotation axis of the hub or the first bending axis of the blade, or a plane through the longitudinal axis of the blade and orthogonal to one of the rotation axis of the hub or the first bending axis of the blade;
wherein the slot-shaped groove reduces a shear stiffness of the shear portion to be smaller than a shear stiffness of the hub connection portion and a shear stiffness of the blade connection portion.

2. The beam according to claim 1, wherein the first flexure portion is closer to the hub connection portion than the shear portion, or vice versa.

3. The beam according to claim 1, wherein at least a part of the first flexure portion forms at least a part of the shear portion.

4. The beam according to claim 1, wherein the first flexure portion is a flap portion and the first bending stiffness is a flap stiffness, the first bending axis being a flap axis orthogonal to the rotation axis of the hub; or the first flexure portion is a lead/lag portion and the first bending stiffness is a lead/lag stiffness and the first bending axis is a lead/lag axis parallel to the rotation axis of the hub.

5. The beam according to the claim 1, wherein:
if the first flexure portion is a flap portion, the second flexure portion is a lead/lag portion and the second bending stiffness of the second flexure portion is a lead/lag stiffness, a lead/lag bending axis being parallel to a third axis parallel to the rotation axis of the hub; or
if the first flexure portion is a lead/lag portion, the second flexure portion is a flap portion and the second bending stiffness of the second flexure portion is a flap stiffness, the flap axis being parallel to the third axis orthogonal to the rotation axis of the hub.

6. The beam according to claim 1, wherein the second flexure portion is closer to the hub connection portion than the shear portion, or vice versa.

7. The beam according to claim 1, further comprising a torsion portion located between the hub connection portion and the blade connection portion and having a torsion stiffness about the longitudinal axis of the blade, the torsion stiffness being smaller than a torsion stiffness of the hub connection portion and a torsion stiffness of the blade connection portion and a torsion stiffness of the first flexure portion.

8. The beam according to the claim 7, wherein at least a part of the shear portion forms at least a part of the torsion portion.

9. The beam according claim 1, wherein the blade connection portion is linked to a bearing via a rod or tube having a bending stiffness and shear stiffness being greater than the bending stiffness and shear stiffness of the hub connection portion and blade connection portion.

10. The beam according to the claim 1, wherein at least one of the slot-shaped grooves is filled with a material having a shear modulus smaller than a shear modulus of the material of the shear portion.

11. A rotorcraft rotor, the rotor having a number of rotor blades and a corresponding number of beams connecting each rotor blade with the hub; the rotorcraft rotor comprising:
   the beam according to claim 1;
   a hub with a first beam connection portion connected to the hub connection portion of the beam;
   a blade with a second beam connection portion connected to the blade connection portion of the beam.

12. The rotorcraft rotor according to the claim 11, wherein at least one of the first beam connection portion of the hub is attached to or integral with one of the hub connection portion or the second beam connection portion of the blade is attached to or integral with the blade connection portion.

13. A beam for attaching a blade to a hub of a rotorcraft, the beam comprising:
   a hub connection portion defining an inboard end and connecting the beam to the hub of the rotor;
   a blade connection portion defining an outboard end and connecting the beam to the blade of the rotor;
   a first flexure portion located between the hub connection portion and the blade connection portion, wherein a first flexure portion height is less than a first flexure portion width and less than a hub connection portion height and a blade connection portion height, wherein the first flexure portion bends about a first bending axis being orthogonal to a longitudinal axis of the blade, a bending stiffness of the first flexure portion being smaller than a bending stiffness of the hub connection portion and smaller than a bending stiffness of the blade connection portion; and
   a second flexure portion located between the hub connection portion and the blade connection portion, wherein the second flexure portion bends about a second bending axis orthogonal to the longitudinal axis of the blade and non-parallel to the first bending axis, a second bending stiffness of the second flexure portion being smaller than the first bending stiffness of the first flexure portion,
   a shear portion located between the hub connection portion and the blade connection portion, wherein the shear portion rotates about a shear axis orthogonal to the first bending axis and parallel to the second bending axis of the blade, a shear stiffness of the shear portion being smaller than a shear stiffness of the hub connection portion and a shear stiffness of the blade connection portion,
   a plurality of parallel slots extending from an outer surface of the shear portion and at least a part of the second flexure portion inward in a direction of at least one of the second bending axis or orthogonal to the second bending axis.

14. The beam according to the claim 13, wherein the first flexure portion height is orthogonal to the direction of the first bending axis and the first flexure portion height is less than a shear portion height.

15. The beam according to the claim 14, wherein the first flexure portion has a cross sectional area less than a cross sectional area of the shear portion, the hub connection portion or the blade connection portion.

16. The beam according to claim 1, wherein a second flexure portion width is less than a second flexure portion height and the second flexure portion width is less than and of a hub connection portion width, a blade connection portion width and a first flexure portion width.

* * * * *